Sept. 17, 1940.        L. A. NELSON        2,214,933

VEHICLE REFRIGERATION SYSTEM

Filed Sept. 29, 1939

Inventor
Laurence A. Nelson
By
Blackmore, Spencer & Flint
Attorneys

Patented Sept. 17, 1940

2,214,933

UNITED STATES PATENT OFFICE 2,214,933

VEHICLE REFRIGERATION SYSTEM

Laurence A. Nelson, Pontiac, Mich., assignor to Yellow Truck & Coach Manufacturing Company, Pontiac, Mich., a corporation of Maine Application September 29, 1939, Serial No. 297,053

2 Claims. (Cl. 62—2)

This invention relates to refrigerating systems for vehicles and more particularly to an automatically operated closure which precludes the entrance of rain into an upwardly opening air discharge duct at times when no air is being discharged.

In a preferred embodiment of the invention a hinged closure door is provided at the air discharge opening in the roof of the vehicle and is moved to open position from its normally closed position by a vacuum responsive device operatively connected with the intake manifold of an internal combustion engine which supplies motive power both to a refrigerating unit and an air blower. As long as the blower is actuated to induce cooling air flow through the heat transfer device and its discharge at the roof outlet opening, the door is held in open position and the force of the upwardly moving column of air prevents the entrance of rain. At other times the air discharge outlet in the roof is closed to exclude rain and snow.

Figure 1:
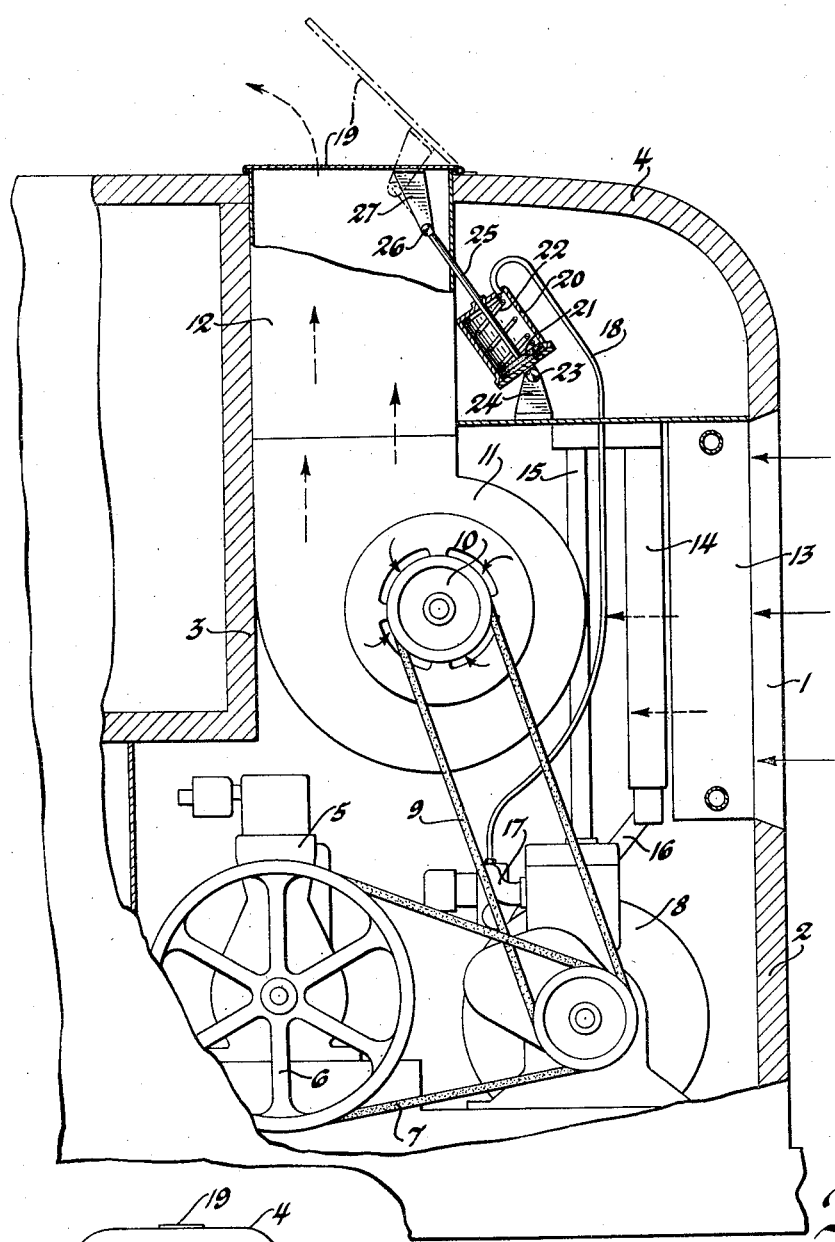
Figure 2:
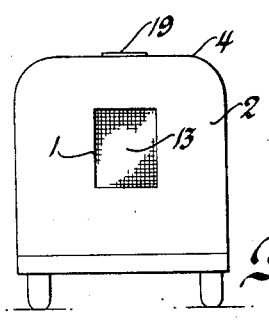

For a better understanding of the invention reference is made to the accompanying drawing wherein Figure 1 is a fragmentary view showing in longitudinal section the front end of a road vehicle of the trailer type and Figure 2 is a front end elevation of the vehicle.

As is well understood a region of high air pressure occurs at the front wall of a forwardly moving vehicle and a region of relatively low air pressure is presented above the roof immediately to the rear of the front wall. Accordingly the entrance and exit openings for heat absorbing air are provided in the front wall and the roof, respectively, in the regions of relatively high and low pressure. In the drawing the reference character 1 indicates the entrance opening for cooling air in the front wall 2. Spaced rearwardly of the front wall 2 is a partition 3 extending between the floor and the roof 4 to define a compartment for the operating mechanism of the refrigerating unit. The refrigerating unit may be employed either for air conditioning a passenger vehicle or for cold storage requirements in a produce conveyance.

The refrigerating unit includes the usual compressor 5 having a pulley 6 driven by a belt 7 from the crankshaft of an internal combustion engine 8. Also driven from the engine by a belt 9 is a pulley 10 of a centrifugal fan or blower housed within the casing 11. The outlet duct 12 from the blower extends vertically upwardly through an opening in the roof 4 for the discharge of air under the force of the blower.

The operation of the blower removes air from the front compartment after the air has entered through the opening 1 and extracted heat both from the refrigerant condenser 13 positioned over the opening and a radiator 14 arranged in tandem behind the condenser 13 and connected in the water cooling system of the engine 8 by the conduits 15 and 16.

As usual the engine is provided with an intake manifold 17 and in the present instance this manifold is connected by a pipe 18 with a pressure responsive device for the actuation of the roof closure door 19, shown by full lines in Figure 1 in its normally closed position over the air discharge duct 12. The pressure responsive device may consist of a cylinder 20 having a vacuum connection at one end through the conduit 18 and an opening to atmosphere at its other end. Between opposite ends of the cylinder 20 is a slidable piston 21 adapted to be moved against the force of the coil spring 22 under atmospheric pressure when depression is present in the intake manifold 17 during engine operation. The cylinder 20 is pivotally mounted at 23 on a supporting bracket 24 while the piston is connected by a rod 25 through a pivotal connection 26 with a door operating lever 27.

As will be readily appreciated the door 19 is held in closed position under influence of the coil spring 22 when the operating mechanism is inactive. Upon operation of the refrigerating system and the requirement for heat dissipation, engine vacuum lifts the piston 21 swinging open the door 19 as indicated by dotted lines in Figure 1, for the outward movement of air ejected by the concurrent operation of the blower.

I claim:

1. In a refrigerated body having a compartment housing the refrigerating apparatus, the combination with an intermittently operating internal combustion engine supplying motive power to the refrigerating apparatus and an engine driven exhaust fan for extracting air from the compartment, of an ascending duct rising vertically from the blower outlet and extending through the compartment roof with its discharge end opening upwardly, a rain excluding roof closure for said discharge end of the ascending duct, and a vacuum operated closure opening motor communicating with the engine intake system for action in unison with intermittent engine operation.

2. In combination, a body, heat absorbing equipment for refrigerating said body, an intermittently operating internal combustion engine for driving the heat absorbing equipment, an air blower also driven by the engine for compelling passage of cooling air through a heat exchange device, a vertical air discharge riser duct leading upwardly from the blower casing outlet and through the body roof with its discharge end directed upwardly, a rain excluding roof cover for said discharge end and a vacuum responsive device arranged to open said roof cover and connected with the engine intake system for response to the intermittent engine operation.

LAURENCE A. NELSON.